US012607466B2

(12) United States Patent
Holder

(10) Patent No.: US 12,607,466 B2
(45) Date of Patent: Apr. 21, 2026

(54) SYSTEM AND METHOD FOR MAP MATCHING GNSS POSITIONS OF A VEHICLE

(71) Applicant: Bayerische Motoren Werke Aktiengesellschaft, Munich (DE)

(72) Inventor: Stefan Holder, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 468 days.

(21) Appl. No.: 18/008,574

(22) PCT Filed: Jul. 9, 2021

(86) PCT No.: PCT/EP2021/069125
§ 371 (c)(1),
(2) Date: Dec. 6, 2022

(87) PCT Pub. No.: WO2022/028811
PCT Pub. Date: Feb. 10, 2022

(65) Prior Publication Data
US 2023/0236020 A1 Jul. 27, 2023

(30) Foreign Application Priority Data

Aug. 5, 2020 (DE) ..................... 10 2020 120 667.4

(51) Int. Cl.
*G01C 21/30* (2006.01)
*G01C 21/34* (2006.01)
(Continued)

(52) U.S. Cl.
CPC ......... *G01C 21/30* (2013.01); *G01C 21/3484* (2013.01); *G08G 1/0125* (2013.01); *G01C 21/3691* (2013.01)

(58) Field of Classification Search
CPC ................ G01C 21/30; G01C 21/3484; G01C 21/3691; G08G 1/0125
(Continued)

(56) References Cited

U.S. PATENT DOCUMENTS 10,533,862 B1 1/2020 Paranjpe et al.
2005/0021229 A1 1/2005 Lee et al.
(Continued)

FOREIGN PATENT DOCUMENTS

CN 1590965 A 3/2005
CN 104900059 A 9/2015
(Continued)

OTHER PUBLICATIONS

International Search Report (PCT/ISA/210) issued in PCT Application No. PCT/EP2021/069125 dated Oct. 7, 2021 with English translation (five (5) pages).
(Continued)

*Primary Examiner* — Isaac G Smith
(74) *Attorney, Agent, or Firm* — Crowell & Moring LLP

(57) ABSTRACT

A computer-implemented method and system for map matching Global Navigation Satellite System (GNSS) positions of a vehicle with location information of a digital map, including map matching the determined distance between two respective detected consecutive GNSS positions of the vehicle with a route length between the two respective consecutive GNSS positions of the vehicle on the digital map.

17 Claims, 3 Drawing Sheets

(51) Int. Cl.
 G08G 1/01 (2006.01)
 G01C 21/36 (2006.01)

(58) Field of Classification Search
 USPC ........................................................ 701/446
 See application file for complete search history.

(56) References Cited

U.S. PATENT DOCUMENTS

| | | | |
|---|---|---|---|
| 2007/0010942 A1* | 1/2007 | Bill | G01C 21/3617 |
| | | | 701/424 |
| 2008/0262730 A1 | 10/2008 | Onome et al. | |
| 2011/0313648 A1 | 12/2011 | Newson et al. | |
| 2012/0209507 A1 | 8/2012 | Serbanescu | |
| 2015/0141036 A1* | 5/2015 | Fix | G08G 1/056 |
| | | | 455/456.1 |
| 2017/0124775 A1* | 5/2017 | Breed | G08G 1/017 |
| 2018/0080775 A1 | 3/2018 | Loomis | |
| 2020/0033139 A1 | 1/2020 | Dogramadzi et al. | |
| 2020/0133288 A1* | 4/2020 | Abari | G05D 1/0088 |
| 2020/0208992 A1* | 7/2020 | Fowe | G01C 21/3811 |
| 2022/0011118 A1* | 1/2022 | Beggel | G06N 7/01 |

FOREIGN PATENT DOCUMENTS

| | | | | | |
|---|---|---|---|---|---|
| CN | 105628033 A | 6/2016 | | | |
| CN | 105928529 A | 9/2016 | | | |
| CN | 106595680 A | 4/2017 | | | |
| CN | 106855415 A | 6/2017 | | | |
| CN | 110793531 A | 2/2020 | | | |
| CN | 111024079 A | 4/2020 | | | |
| CN | 111256710 A | 6/2020 | | | |
| JP | H11211491 A | * | 1/1998 | | |
| JP | 2002188935 A | * | 7/2002 | | |
| JP | 2014126919 A | * | 7/2014 | ............ | G01C 21/14 |
| KR | 20030009942 A | * | 2/2003 | | |
| KR | 10-2014-0077592 A | | 6/2014 | | |
| KR | 10-2015-0050837 A | | 5/2015 | | |
| WO | WO 2020/109516 A1 | | 6/2020 | | |

OTHER PUBLICATIONS

German-language Written Opinion (PCT/ISA/237) issued in PCT Application No. PCT/EP2021/069125 dated Oct. 7, 2021 (seven (7) pages).

German-language Office Action issued in German Application No. 10 2020 120 667.4 dated Apr. 21, 2021 (five (5) pages).

Newson et al., "Hidden Markov Map Matching Through Noise and Sparseness," Proceedings of the 17th ACM SIGSPATIAL International Conference on Advances in Geographic Information Systems, ACM, 2009, pp. 1-8 (eight (8) pages).

Chinese-language Office Action issued in Chinese Application No. 202180035836.3 dated Aug. 16, 2024 with English translation (14 pages).

Korean-language Office Action issued in Korean Application No. 10-2022-7039496 dated Feb. 27, 2025 with English translation (9 pages).

* cited by examiner

SYSTEM AND METHOD FOR MAP MATCHING GNSS POSITIONS OF A VEHICLE

BACKGROUND AND SUMMARY

The invention relates to a computer-implemented method for map matching Global Navigation Satellite System (GNSS) positions of a vehicle with location information from a digital road map. The invention also relates to a system for map matching GNSS positions of a vehicle with location information from a digital road map.

During map matching, a sequence of GNSS positions is mapped to a road network in a digital road map. Such map matching methods are intended to make a relative improvement in the mapping accuracy, for example the mapping of positions of a vehicle to corresponding road links. In this case, the road on which the vehicle has driven is determined for each GNSS position.

A distinction is made between online and offline map matching. Whereas each GNSS position is matched to the road in real time without knowledge of subsequent GNSS positions in online map matching, the GNSS positions are matched after the journey or the journey section has been recorded in offline map matching. Both online and offline map matching can be carried out both in the vehicle and, after transmitting GNSS positions, in the backend. However, online map matching is often used in the vehicle and offline map matching is often used in the backend.

The GNSS position of the vehicle is determined at a frequency of 1 Hz in the vehicle and can be collected for further processing at this frequency or at a lower frequency. Furthermore, dead reckoning is used to determine the vehicle position in an even more precise manner.

For different applications, the vehicle positions possibly improved with dead reckoning are mapped to the road network in the vehicle or after transmission to a backend using offline map matching. Map matching in the backend instead of in the vehicle has the advantage that the most up-to-date digital road map is always located in the backend. Furthermore, a better result can generally be achieved by means of offline map matching than with map matching during the journey.

As described in Newson, Paul, and John Krumm: "Hidden Markov map Matching through noise and sparseness", Proceedings of the 17th ACM SIGSPATIAL international conference on advances in geographic information systems, ACM, 2009, for example, a road network can be modeled as a graph which can consist of both directed and undirected edges. In contrast to the publication by Newson and Krumm, a directed edge need not necessarily mean a one-way street, since roads which can be used in both directions can also be modeled as two directed edges. Each edge has a description of its geometry, for example as a polyline (that is to say as a line which is composed of a plurality of segments). Map manufacturers offer maps in different formats with different modeling. In some modeling, links can end only at intersections or there are only directed edges. However, the above-mentioned modeling is the most general case.

Newson and Krumm describe a map matching method on the basis of the hidden Markov model (HMM). This method calculates the most likely sequence of links via which the vehicle has driven with the aid of the Viterbi algorithm. In this case, each GNSS position is mapped to a so-called matching of the combination of link and position on the link (<link, position on link>for short). The position on a link may be effected, for example, as a fraction, that is to say as a number between 0 and 1.

However, the above-mentioned method according to Newson and Krumm is susceptible to map errors in the road topology, for example missing roads in the road map, and in the road geometry.

There is therefore a need to provide an improved map matching method and system having a higher degree of accuracy.

The object is achieved with a computer-implemented method for map matching GNSS positions of a vehicle with location information from a digital road map having the features disclosed herein.

The object is also achieved with a system for map matching GNSS positions of a vehicle with location information from a digital road map having the features disclosed herein.

In addition, the object is achieved with a computer program having the features disclosed herein and with a computer-readable data storage medium having the features disclosed herein.

The present invention provides a computer-implemented method for map matching GNSS positions with location information from a digital road map. Location information comprises, for example, location-specific coordinates of the digital road map.

The method comprises capturing GNSS positions of the vehicle along a route of the vehicle.

The method also comprises recording a distance between in each case two captured, successive GNSS positions of the vehicle, which is determined using a vehicle sensor, in particular a wheel speed sensor. The method also comprises map matching the determined distance between the in each case two captured, successive GNSS positions of the vehicle with a route length between the in each case two captured, successive GNSS positions of the vehicle in the digital road map.

The present invention also provides a system for map matching GNSS positions of a vehicle with location information from a digital road map. The system comprises means for capturing GNSS positions of the vehicle along a route of the vehicle.

The system also comprises means for recording a distance between in each case two captured, successive GNSS positions of the vehicle, which is determined using a vehicle sensor, in particular a wheel speed sensor. The system also comprises means for map matching the determined distance between the in each case two captured, successive GNSS positions of the vehicle with a route length between the in each case two captured, successive GNSS positions of the vehicle in the digital road map.

The present invention also provides a computer program having program code for carrying out the method according to the invention when the computer program is executed on a computer.

The present invention also provides a computer-readable data storage medium having program code of a computer program for carrying out the method according to the invention when the computer program is executed on a computer.

One concept of the present invention is to record the distance covered since the beginning of the journey for each GNSS position using the odometry of the vehicle and to therefore improve the map matching accuracy. This is carried out by comparing the distance covered between two successive GNSS positions in each case, which is determined using the odometry, with the route length between the two matched GNSS positions in the digital road map. A higher degree of map matching accuracy can therefore be advantageously achieved.

Advantageous embodiments and developments emerge from the claims and from the description with reference to the figures.

One preferred development provides for the map matching to be carried out in real time, after recording a journey or after recording a journey section using a computing device inside the vehicle and/or a server outside the vehicle, wherein a time stamp is assigned to each captured GNSS position of the vehicle. The best possible implementation consisting of online and/or offline map matching can therefore be advantageously used depending on systemic requirements.

A further preferred development provides for a probability density for a transition from matching candidate $c_{t,i}$ in a time step t to matching candidate $c_{t+1,j}$ in a time step t+1 to be calculated using the following equation:

$$p(r, d) = \frac{1}{\sigma\sqrt{2\pi}} e^{-\frac{1}{2}\left(\frac{r-d}{\sigma}\right)^2}$$

where r is the length of the quickest route between $c_{t,i}$ and $c_{t+1,j}$; d is the distance covered between the times t and t+1; p or p(r, d) is the probability density, where $\sigma$ is the standard deviation of the captured GNSS positions, and where i and j are numerical placeholders for ground truth road segments or location information, wherein the location information in the present embodiment is denoted P1a, P1b, P1c, P2a, P2b, P3a, P3b.

In the present embodiment, the matching candidates are denoted M1a, M1b, M1c, M2a, M2b, M3a, M3b. The probability density for the transition from matching candidate $c_{t,i}$ in a time step t to matching candidate $c_{t+1,j}$ in a time step t+1 could therefore denote, for example, the probability density for the transition from matching candidate M1c to matching candidate M2b.

In a further preferred development, a kernel density estimator is used instead of the above-mentioned equation. A probability distribution can therefore be advantageously calculated with the inclusion of the length of the quickest route and the distance covered without having to make assumptions about the structure of the density distribution.

A further preferred development provides for a standard deviation $\sigma$ to be determined using the root of a sample variance of a sample of GNSS positions and vehicle sensor distance measurements for a plurality of journeys, the driven route of which is known. In this case, the standard deviation is advantageously determined using the root of the sample variance of the sample of ground truth data. The GNSS positions and odometry measurements for a plurality of journeys, the driven route of which is known, are used as ground truth data.

A further preferred development provides for transitions between matching candidates to be excluded if the route length of the quickest route between the matching candidates is shorter or longer by a predefined factor than the distance determined using the vehicle sensor. A further criterion which makes it possible to determine the best possible matching candidate in an improved manner can therefore be advantageously used.

A further preferred development provides for GNSS positions, a current speed and/or a current average speed of a multiplicity of vehicles to be periodically transmitted to the server outside the vehicle and to be used by the server outside the vehicle to calculate traffic information, in particular an expected time of arrival and/or average speeds of road sections, and to make the information available to the multiplicity of vehicles. Map matching can therefore also be used to calculate a more accurate prediction of an expected time of arrival and/or average speeds of road sections and to make it available to a multiplicity of vehicles in a vehicle fleet.

A further preferred development provides for hazard data captured by vehicle sensors, in particular relating to a slippery road, a traffic accident and/or airbag activation, to be transmitted to the server outside the vehicle together with the GNSS position of the vehicle, wherein the server outside the vehicle carries out map matching of the hazard data and makes these data available to vehicles whose planned route goes through a recognized hazard. Map matching can therefore likewise be advantageously used to make hazard information available to other vehicles in the vehicle fleet.

A further preferred development provides for a personal route of a driver to be recorded as a sequence of GNSS positions and to be transmitted to the server outside the vehicle, wherein the server outside the vehicle carries out map matching of the GNSS positions, transmits the learned personal route of the driver to the vehicle and suggests route guidance for the learned personal route to the driver at predefined times. Therefore, the practice of learning the personal route of a driver can be advantageously used to suggest this route to the driver at suitable times at which the system considers it likely for the route to be used on the basis of the collected data.

A further preferred development provides for the distance between in each case two captured, successive GNSS positions of the vehicle, which is determined using the vehicle sensor, to be used to check the plausibility of map matching results, wherein a length of the quickest route between two adjacent matched GNSS positions is calculated in each case, wherein at least one of the two determined GNSS positions of the vehicle is classified as implausible if the length is shorter or longer by a predefined factor than the distance determined using the vehicle sensor. Such checking of the plausibility of the map matching results likewise advantageously contributes to a higher degree of map matching accuracy.

The described configurations and developments can be combined with one another in any desired manner.

Further possible configurations, developments and implementations of the invention also comprise combinations that are not explicitly mentioned of features of the invention that are described above or below with regard to the exemplary embodiments.

The accompanying drawings are intended to convey a further understanding of the embodiments of the invention. They illustrate embodiments and are used, in connection with the description, to explain principles and concepts of the invention.

Other embodiments and many of the advantages mentioned become apparent in view of the drawings. The elements illustrated in the drawings are not necessarily shown in a manner true to scale with respect to one another.

DETAILED DESCRIPTION

Figure 1:
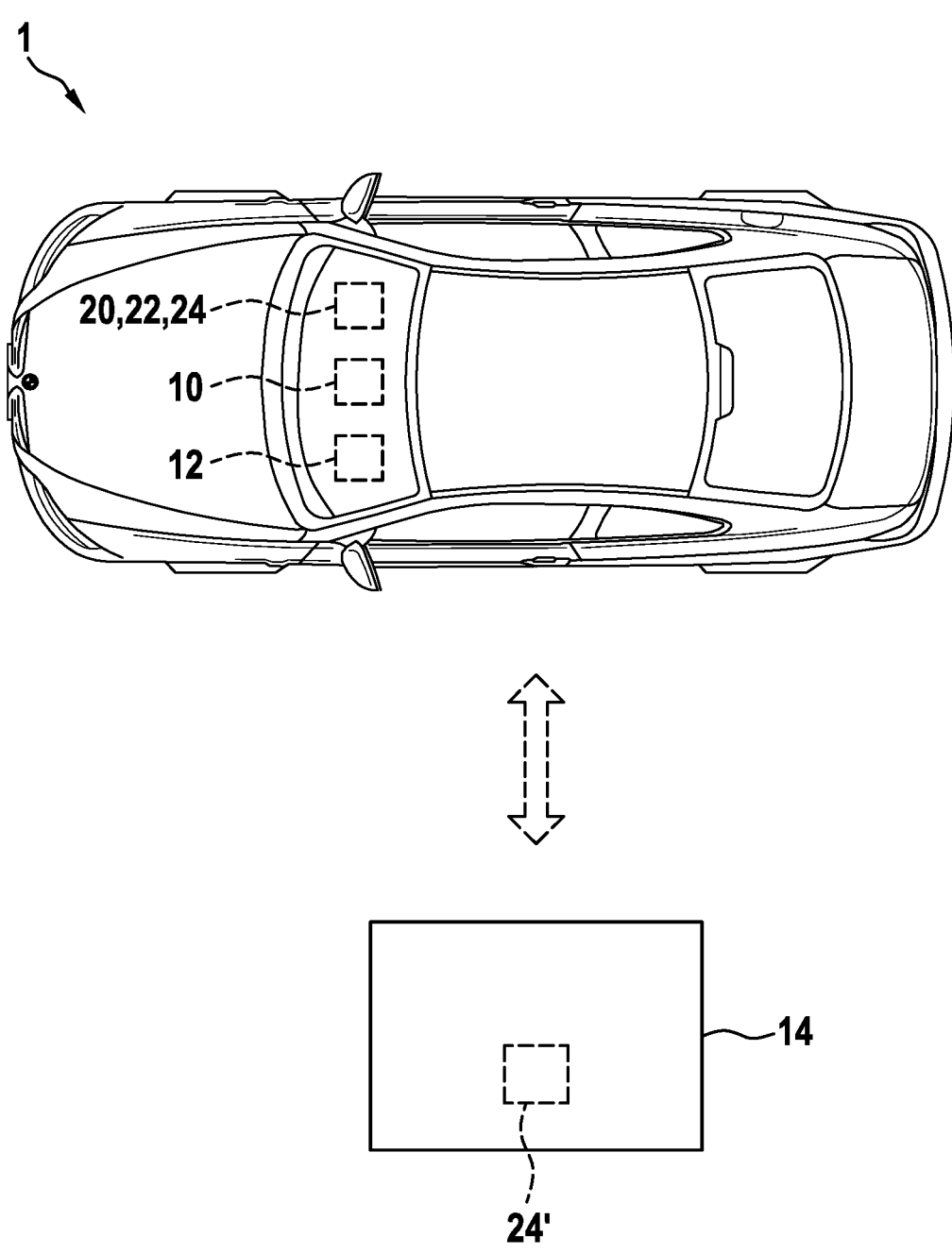
FIG. 1 shows a schematic illustration of a system for map matching GNSS positions of a vehicle with location information from a digital road map according to one preferred embodiment of the invention.

The system for map matching GNSS positions of the vehicle 1 with location information from a digital road map, as shown in FIG. 1, comprises the vehicle 1 having means 20 for capturing GNSS positions of the vehicle 1 along a route of the vehicle 1. Within the scope of the present embodiment, GPS is the preferred form of GNSS.

The system also comprises means 22 for recording a distance between in each case two captured, successive GNSS positions of the vehicle 1, which is determined using a vehicle sensor 10, in particular a wheel speed sensor. The system also comprises means 24 for map matching the determined distance between the in each case two captured, successive GNSS positions of the vehicle 1 with a route length between the in each case two captured, successive GNSS positions of the vehicle in the digital road map.

The map matching is preferably carried out in real time using a computing device 12 inside the vehicle and a server 14 outside the vehicle, wherein a time stamp is assigned to each captured GNSS position of the vehicle 1.

Alternatively, the map matching can be carried out, for example, after recording a journey or after recording a journey section using the computing device 12 inside the vehicle and/or the server 14 outside the vehicle.

As illustrated in FIG. 1, the means 24' for map matching may alternatively be arranged on the server 14 outside the vehicle, for example.

The vehicle 1 also has further sensors which are not illustrated in FIG. 1, inter alia a speed sensor, a sensor for detecting airbag activation, sensors for detecting slippery roads and/or camera sensors.

The server 14 outside the vehicle has a receiving unit which is not illustrated in FIG. 1. On the basis of the data received from the vehicle 1, the server 14 outside the vehicle also calculates traffic information, calculates hazard warnings and/or learns a personal route of the driver. The calculated data are then made available to further vehicles in a vehicle fleet.

Figure 2:
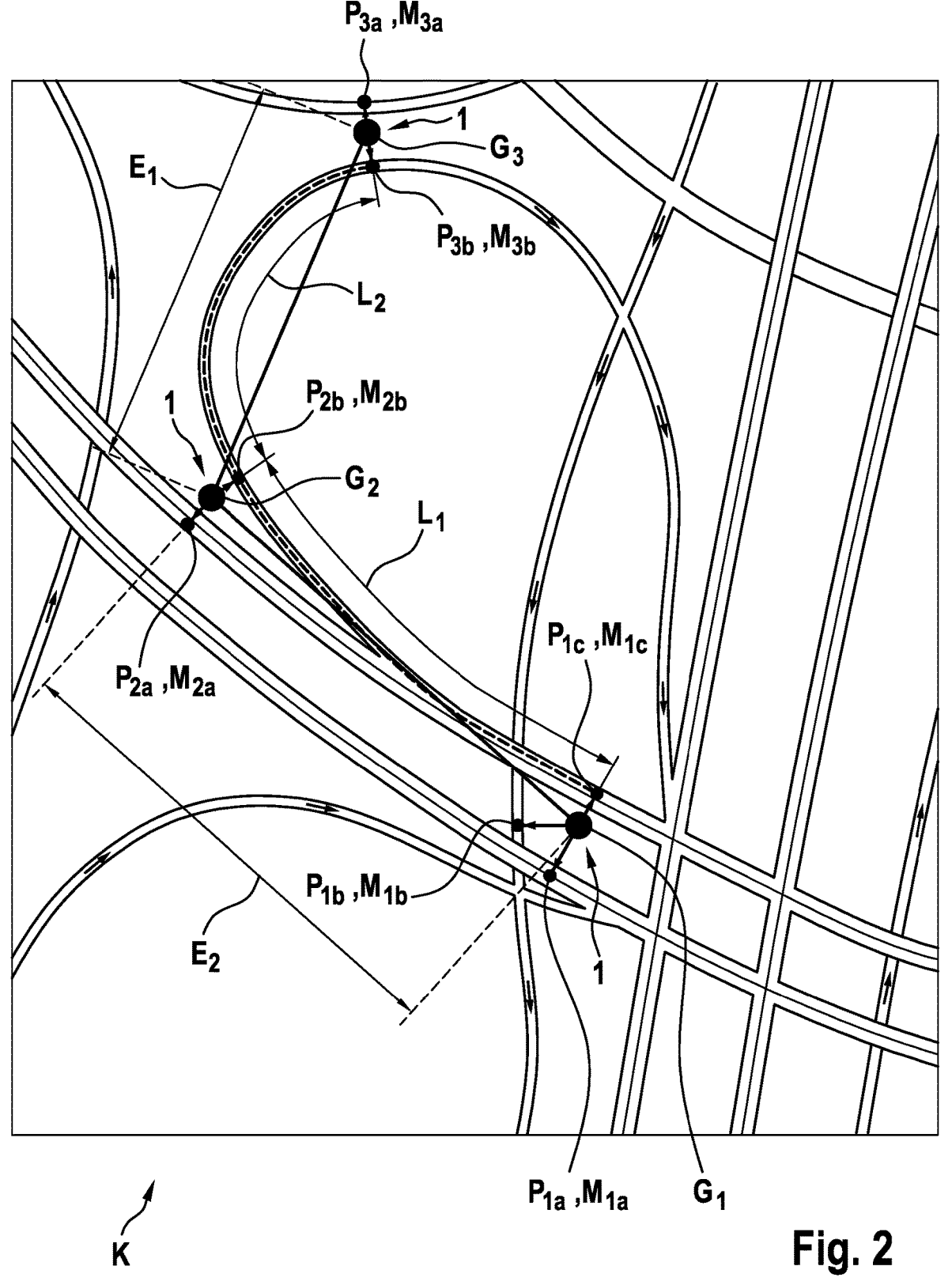
FIG. 2 shows a schematic illustration of a digital road map for illustrating the method for map matching GNSS positions of the vehicle with location information from the digital road map according to the preferred embodiment of the invention.

FIG. 2 shows a schematic illustration of a digital road map for illustrating the method for map matching GNSS positions of the vehicle with location information from the digital road map according to the preferred embodiment of the invention.

In the present illustration, three GNSS positions G1, G2, G3 of the vehicle 1 are represented in the digital road map K by way of example. Since the GNSS positions G1, G2, G3 of the vehicle 1 are depicted in the road map K in a manner offset with respect to respective roads of the digital road map K in the present exemplary embodiment, map matching of the GNSS positions G1, G2, G3 of the vehicle 1 with location information from the digital road map K must be carried out in order to calculate a movement path of the vehicle 1.

A first GNSS position G1 of the vehicle 1 is in the vicinity of the three road sections or location information items P1a, P1b, P1c, for example.

A second GNSS position G2 of the vehicle 1 is likewise in the vicinity of two road sections or location information items P2a, P2b. In addition, a third GNSS position G3 of the vehicle 1 is in the vicinity of two roads or road sections or location information items P3a, P3b.

The GNSS positions G1, G2, G3 of the vehicle 1 along a route of the vehicle 1 are therefore captured first of all. A distance E1, E2 between in each case two captured, successive GNSS positions of the vehicle 1, for example a distance E1 between the first GNSS position G1 and the second GNSS position G2, which is determined using the vehicle sensor, in particular the wheel speed sensor, is then recorded.

The determined distance E1 between the first GNSS position G1 and the second GNSS position G2 of the vehicle 1 is then compared with a first route length L1 in the digital road map K.

A second distance E2 between the second GNSS position G2 and the third GNSS position G3 is likewise captured and a determined distance E2 between the second GNSS position G2 and the third GNSS position G3 is compared with a route length L2 in the digital road map K.

In addition, a probability density for a transition from matching candidate $c_{t,i}$ in a time step t to matching candidate $c_{t+1,j}$ in a time step t+1 is calculated using the following equation:

$$p(r, d) = \frac{1}{\sigma\sqrt{2\pi}}e^{-\frac{1}{2}\left(\frac{r-d}{\sigma}\right)^2}$$

where r is the length of the quickest route between $c_{t,i}$ and $c_{t+1,j}$; d is the distance covered between the times t and t+1; p or p(r, d) is the probability density, where σ is the standard deviation of the captured GNSS positions, and where i and j are numerical placeholders for ground truth road segments or location information, wherein the location information is denoted P1a, P1b, P1c, P2a, P2b, P3a, P3b in the present embodiment.

In the present embodiment, the matching candidates are denoted M1a, M1b, M1c, M2a, M2b, M3a, M3b. The probability density for the transition from matching candidate $c_{t,i}$ in a time step t to matching candidate $c_{t+1,j}$ in a time step t+1 could therefore denote, for example, the probability density for the transition from matching candidate M1c to matching candidate M2b.

A standard deviation σ is determined using the root of a sample variance of a sample of GNSS positions G1, G2, G3 and vehicle sensor distance measurements for a plurality of journeys, the driven route of which is known.

Transitions between matching candidates M1a, M1b, M1c, M2a, M2b, M3a, M3b are excluded if the route length L1, L2 of the quickest route between the matching candidates M1a, M1b, M1c, M2a, M2b, M3a, M3b is shorter or longer by a predefined factor than the distance E1, E2 determined using the vehicle sensor 10.

GNSS positions G1, G2, G3, a current speed and/or a current average speed of a multiplicity of vehicles is/are periodically transmitted to the server 14 outside the vehicle and is/are used by the server 14 outside the vehicle to calculate traffic information, in particular an expected time of arrival and/or average speeds of road sections, and to make it available to the multiplicity of vehicles.

Hazard data captured by vehicle sensors, in particular relating to a slippery road, a traffic accident and/or airbag activation, are transmitted to the server 14 outside the vehicle together with the GNSS position G1, G2, G3 of the vehicle 1, wherein the server 14 outside the vehicle carries out map matching of the hazard data and makes these data available to vehicles 1 whose planned route goes through a recognized hazard.

A personal route of a driver is recorded as a sequence of GNSS positions G1, G2, G3 and is transmitted to the server 14 outside the vehicle.

The server 14 outside the vehicle carries out map matching of the GNSS positions G1, G2, G3, transmits the learned personal route of the driver to the vehicle 1 and suggests route guidance for the learned personal route to the driver at predefined times.

The distance E1, E2 between in each case two captured, successive GNSS positions G1, G2, G3 of the vehicle 1, which is determined using the vehicle sensor 10, is used to check the plausibility of map matching results.

A length of the quickest route between two adjacent matched GNSS positions G1, G2, G3 is calculated in each case. At least one of the two determined GNSS positions G1, G2, G3 of the vehicle 1 is classified as implausible if the length is shorter or longer by a predefined factor than the distance E1, E2 determined using the vehicle sensor 10.

Figure 3:
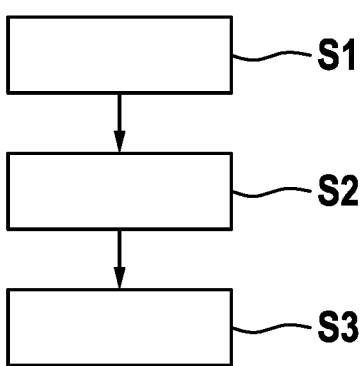
FIG. 3 shows a flowchart of a computer-implemented method for map matching GNSS positions of a vehicle with location information from the digital road map.

FIG. 3 shows a flowchart of a computer-implemented method for map matching GNSS positions of a vehicle with location information from the digital road map.

The method comprises capturing S1 GNSS positions G1, G2, G3 of the vehicle 1 along a route of the vehicle 1.

The method also comprises recording S2 a distance E1, E2 between in each case two captured, successive GNSS positions G1, G2, G3 of the vehicle 1, which is determined using a vehicle sensor 10, in particular a wheel speed sensor.

The method moreover comprises map matching S3 the determined distance E1, E2 between the in each case two captured, successive GNSS positions G1, G2, G3 of the vehicle 1 with a route length L1, L2 between the in each case two captured, successive GNSS positions G1, G2, G3 of the vehicle 1 in the digital road map K.

The term "vehicle" comprises automobiles, trucks, buses, motorhomes, motorcycles, etc. which are used to convey persons, goods, etc.

In particular, the term comprises motor vehicles for conveying persons. Additionally or alternatively, a hybrid or electric vehicle according to embodiments may be a pure electric vehicle (BEV) or a plug-in hybrid vehicle (PHEV). However, other drive forms can also be used, for example in the form of a diesel-powered or gasoline-powered vehicle. The vehicle may also be in the form of a rail vehicle.

Although the invention has been explained and illustrated more specifically in detail by means of preferred exemplary embodiments, the invention is not restricted by the disclosed examples and other variations can be derived therefrom by a person skilled in the art without departing from the scope of protection of the invention.

It is therefore clear that there are a multiplicity of possible variations. Embodiments mentioned by way of example are only examples which should not be interpreted in any way as a limitation of the scope of protection, of the possible uses or of the configuration of the invention, for instance.

Rather, the preceding description and the description of the figures make it possible for a person skilled in the art to specifically implement the exemplary embodiments, in which case a person skilled in the art with knowledge of the disclosed concept of the invention can make various modifications, for example in terms of the function or the arrangement of individual elements mentioned in an exemplary embodiment, without departing from the scope of protection which is defined by the claims and their legal equivalents, for instance more in-depth explanations in the description.

The map matching S3 can alternatively be carried out, for example, between two arbitrary GNSS positions G1, G2, G3 of the vehicle 1 with a route length L1, L2 between in each case two corresponding arbitrary GNSS positions G1, G2, G3 of the vehicle 1 in the digital road map K.

The invention claimed is:

1. A computer-implemented method for map matching Global Navigation Satellite System (GNSS) positions of a vehicle with location information from a digital road map, the method comprising:

capturing, using a GNSS position sensor, a plurality of GNSS positions of the vehicle along a route of the vehicle;

detecting, using a vehicle sensor, a distance between two captured, successive GNSS positions of the vehicle of the plurality of GNSS positions, and recording the distance; and map matching the distance between the two captured, successive GNSS positions of the vehicle with a route length between the two captured, successive GNSS positions of the vehicle in the digital road map, wherein the map matching comprises calculating a probability density for a transition from a first matching candidate location $c_{t,i}$ in the digital road map in a time step t to a second matching candidate location $c_{t+1,j}$ in the digital road map in a time step t+1 using the following equation:

$$p(r, d) = \frac{1}{\sigma\sqrt{2\pi}} e^{-\frac{1}{2}\left(\frac{r-d}{\sigma}\right)^2}$$

where r is a route length of a quickest route in the digital road map between $c_{t,i}$ and $c_{t+1,j}$, d is a distance traveled by the vehicle between the time step t and the time step t+1, p(r,d) is the probability density, $\sigma$ is a standard deviation of the plurality of GNSS positions, and i and j are numeric placeholders for location information, wherein the method further comprises:

periodically transmitting a current speed and/or a current average speed of a plurality of vehicles to the server outside the vehicle; and using, by the server outside the vehicle, at least the current speed and/or the current average speed of the plurality of vehicles to calculate traffic information, and wherein using the current speed and/or the current average speed of the plurality of vehicles to calculate traffic information further comprises calculating an expected time of arrival and/or average speeds of road sections.

2. The computer-implemented method according to claim 1, further comprising detecting the distance between the two captured, successive GNSS positions of the vehicle using a wheel speed sensor.

3. The computer-implemented method according to claim 1, wherein the map matching is carried out in real time, after recording a journey or after recording a journey section using a computing device inside the vehicle and/or a server outside the vehicle, and wherein a time stamp is assigned to each captured GNSS position of the vehicle.

4. The computer-implemented method according to claim 3, further comprising:

periodically transmitting at least some of the plurality of GNSS positions to the server outside the vehicle;

using, by the server outside the vehicle, the at least some of the plurality of GNSS positions to calculate the traffic information; and making the traffic information available to the plurality of vehicles.

5. The computer-implemented method according to claim 3, further comprising:

capturing hazard data by at least one other vehicle sensor, wherein the hazard data indicating at least one of a slippery road, a traffic accident, and/or airbag activation; and transmitting, to the server outside the vehicle, the hazard data and the GNSS position of the vehicle, wherein the server outside the vehicle carries out map matching of the hazard data to the digital road map and makes the hazard data available to other vehicles whose planned route goes through a recognized hazard.

6. The computer-implemented method according to claim 3, further comprising:

recording a personal route of a driver as a sequence of GNSS positions; and transmitting, to the server outside the vehicle, the personal route, wherein the server outside the vehicle carries out the map matching, transmits a learned personal route of the driver to the vehicle, and suggests route guidance for the learned personal route to the driver at predefined times.

7. The computer-implemented method according to claim 1, wherein the standard deviation $\sigma$ is determined using a root of a sample variance of a sample of the plurality of GNSS positions and vehicle sensor distance measurements for a plurality of journeys, wherein driven routes of the plurality of journeys are known.

8. The computer-implemented method according to claim 1, wherein transitions between $c_{t,i}$ and $c_{t+1,j}$ are excluded in response to the route length of the quickest route between $c_{t,i}$ and $c_{t+1,j}$ being shorter or longer at least by a predefined factor than the distance determined using the vehicle sensor.

9. The computer-implemented method according to claim 1, further comprising:

using the distance between the two captured, successive GNSS positions of the vehicle to check a plausibility of results of the map matching, wherein at least one of the first matching candidate location $c_{t,i}$ or the second matching candidate location $c_{t+1,j}$ is classified as implausible in response to the route length of the quickest route being shorter or longer by at least a predefined factor than the distance (d) traveled by the vehicle.

10. A system for map matching Global Navigation Satellite System (GNSS) positions of a vehicle with location information from a digital road map, comprising:

a GNSS position sensor configured to capture a plurality of GNSS positions of the vehicle along a route of the vehicle;

a vehicle sensor configured to detect a distance between two captured, successive GNSS positions of the vehicle of the plurality of GNSS positions, and recording the distance; and at least one computing device configured to:

receive and record the plurality of GNSS positions and the distance between the two captured, successive GNSS positions; and map match the distance between the two captured, successive GNSS positions of the vehicle with a route length between the two captured, successive GNSS positions of the vehicle in the digital road map, wherein the map matching further comprises calculating a probability density for a transition from a first matching candidate location $c_{t,i}$ in the digital road map in a time step t to a second matching candidate location $c_{t+1,j}$ in the digital road map in a time step t+1 using the following equation:

$$p(r, d) = \frac{1}{\sigma\sqrt{2\pi}} e^{-\frac{1}{2}\left(\frac{r-d}{\sigma}\right)2}$$

where r is a route length of a quickest route in the digital road map between $c_{t,i}$ and $c_{t+1,j}$, d is a distance traveled by the vehicle between the time step t and the time step t+1, p(r,d) is the probability density, $\sigma$ is a standard deviation of the plurality of GNSS positions, and i and j are numeric placeholders for location information, wherein the at least one computing device is further configured to:

periodically receive a current speed and/or a current average speed of a plurality of vehicles; and use the current speed and/or the current average speed of the plurality of vehicles to calculate traffic information, wherein using the current speed and/or the current average speed of the plurality of vehicles to calculate traffic information further comprises calculating an expected time of arrival and/or average speeds of road sections.

11. The system according to claim 10, wherein the at least one computing device is further configured to:

record a journey or a journey section;

perform the map matching in real time, after recording the journey or the journey section, wherein a time stamp is assigned to each captured GNSS position of the vehicle.

12. The system according to claim 11, wherein the at least one computing device is further configured to:

periodically receive at least some of the plurality of GNSS positions;

use the at least some of the plurality of GNSS positions to calculate the traffic information; and make the traffic information available to the plurality of vehicles.

13. The system according to claim 11, wherein the at least one computing device is further configured to:

capture hazard data by at least one other vehicle sensor, wherein the hazard data indicates at least one of a slippery road, a traffic accident, and/or airbag activation; and perform map matching of the hazard data to the digital road map and make the hazard data available to other vehicles whose planned route goes through a recognized hazard.

14. The system according to claim 11, wherein the at least one computing device is further configured to:

record a personal route of a driver as a sequence of GNSS positions;

perform the map matching; and transmit a learned personal route of the driver to the vehicle and suggest route guidance for the learned personal route to the driver at predefined times.

15. The system according to claim 10, wherein the at least one computing device is further configured to:

exclude transitions between $c_{t,i}$ and $c_{t+1,j}$ in response to the route length of the quickest route between $c_{t,i}$ and $c_{t+1,j}$ being shorter or longer at least by a predefined factor than the distance determined using the vehicle sensor.

16. The system according to claim 10, wherein the at least one computing device is further configured to:

use the distance between the two captured, successive GNSS positions of the vehicle to check a plausibility of results of the map matching; and classify at least one of the first matching candidate location $c_{t,i}$ or the second matching candidate location $c_{t+1,j}$ as implausible in response to the route length of the quickest route being shorter or longer by at least a predefined factor than the distance (d) traveled by the vehicle.

17. A non-transitory computer-readable data storage medium having stored thereon a computer program that, when executed by at least one computing device, cause the at least one computing device to perform a method comprising:

capturing a plurality of Global Navigation Satellite System (GNSS) positions of a vehicle along a route of the vehicle using a GNSS position sensor;

detecting, using a vehicle sensor, a distance between two captured, successive GNSS positions of the vehicle of the plurality of GNSS positions; and map matching the distance between the two captured, successive GNSS positions of the vehicle with a route length between the two captured, successive GNSS positions of the vehicle in a digital road map, wherein the map matching comprises calculating a probability density for a transition from a first matching candidate location $c_{t,i}$ in the digital road map in a time step t to a second matching candidate location $c_{t+1,j}$ in the digital road map in a time step t+1 using the following equation:

$$p(r, d) = \frac{1}{\sigma\sqrt{2\pi}} e^{-\frac{1}{2}\left(\frac{r-d}{\sigma}\right)^2}$$

where r is a route length of a quickest route in the digital road map between $c_{t,i}$ and $c_{t+1,j}$, d is a distance traveled by the vehicle between the time step t and the time step t+1, p(r,d) is the probability density, $\sigma$ is a standard deviation of the plurality of GNSS positions, and i and j are numeric placeholders for location information, wherein the method further comprises:

periodically transmitting a current speed and/or a current average speed of a plurality of vehicles to the server outside the vehicle; and using, by the server outside the vehicle, at least the current speed and/or the current average speed of the plurality of vehicles to calculate traffic information, and wherein using the current speed and/or the current average speed of the plurality of vehicles to calculate traffic information further comprises calculating an expected time of arrival and/or average speeds of road sections.

\* \* \* \* \*